(12) United States Patent
Kawamura et al.

(10) Patent No.: US 12,530,014 B2
(45) Date of Patent: Jan. 20, 2026

(54) PROCESS MODEL AUTOMATIC GENERATION SYSTEM AND PROCESS MODEL AUTOMATIC GENERATION METHOD

(71) Applicant: Hitachi, Ltd., Tokyo (JP)

(72) Inventors: Riku Kawamura, Tokyo (JP); Hitoshi Ishida, Tokyo (JP); Takashi Amano, Tokyo (JP); Takehiro Hagiwara, Tokyo (JP); Hiroki Miyamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 417 days.

(21) Appl. No.: 18/114,462

(22) Filed: Feb. 27, 2023

(65) Prior Publication Data

US 2024/0019840 A1    Jan. 18, 2024

(30) Foreign Application Priority Data

Jul. 14, 2022   (JP) .................. 2022-113559

(51) Int. Cl.
*G05B 19/4097*  (2006.01)
*G05B 11/06*    (2006.01)

(52) U.S. Cl.
CPC .......... *G05B 19/4097* (2013.01); *G05B 11/06* (2013.01); *G05B 2219/35499* (2013.01)

(58) Field of Classification Search
CPC ............ G05B 19/4097; G05B 11/06; G05B 2219/35499; G05B 19/41885

See application file for complete search history.

(56) References Cited

U.S. PATENT DOCUMENTS 6,842,746 B1 *   1/2005  Kauffman .............. G06Q 10/06
                                              455/452.2
2005/0065830 A1*  3/2005  Duke ............... G06Q 10/06316
                                              705/7.26

(Continued)

FOREIGN PATENT DOCUMENTS

JP    2002-62922 A    2/2002
JP    2019-153051 A   9/2019

OTHER PUBLICATIONS

Lin, G. "Effectiveness of Flexible routing control", 1991, The International Journal of Flexible Manufacturing Systems, 3 (1991): 189-211 (Year: 1991).*

*Primary Examiner* — Hien D Khuu
*Assistant Examiner* — Jonathan Michael Skrzycki
(74) *Attorney, Agent, or Firm* — MATTINGLY & MALUR, PC

(57) ABSTRACT

A production system between processes is automatically determined using work performance data acquired at a production site, and a process model in which a flow shop and a job shop are mixed is automatically generated. A process model automatic generation system 210 reads work performance data from work performance data 120 and extracts a process flow for each product (130). Next, a synthesis flow obtained by combining a plurality of process flows is created, and a production system between processes corresponding to a closed path is changed to a job shop to automatically determine a production system (140). Finally, a process model in which a flow shop and a job shop are mixed is generated (150) and displayed on a display screen 160.

8 Claims, 19 Drawing Sheets

(56) References Cited

U.S. PATENT DOCUMENTS

| | | | |
|---|---|---|---|
| 2007/0091355 A1* | 4/2007 | Rai | G06F 3/1275 |
| | | | 709/201 |
| 2009/0113394 A1* | 4/2009 | Weber | G06F 8/10 |
| | | | 717/126 |
| 2013/0208315 A1 | 8/2013 | Zeng et al. | |
| 2014/0136252 A1* | 5/2014 | Norman | G06F 8/45 |
| | | | 705/7.13 |
| 2018/0032065 A1* | 2/2018 | Delgado Arana | |
| | | | G05B 19/41865 |
| 2019/0271969 A1 | 9/2019 | Miyamoto et al. | |
| 2022/0027808 A1* | 1/2022 | Hagiwara | G05B 19/41885 |

* cited by examiner

[FIG. 1]
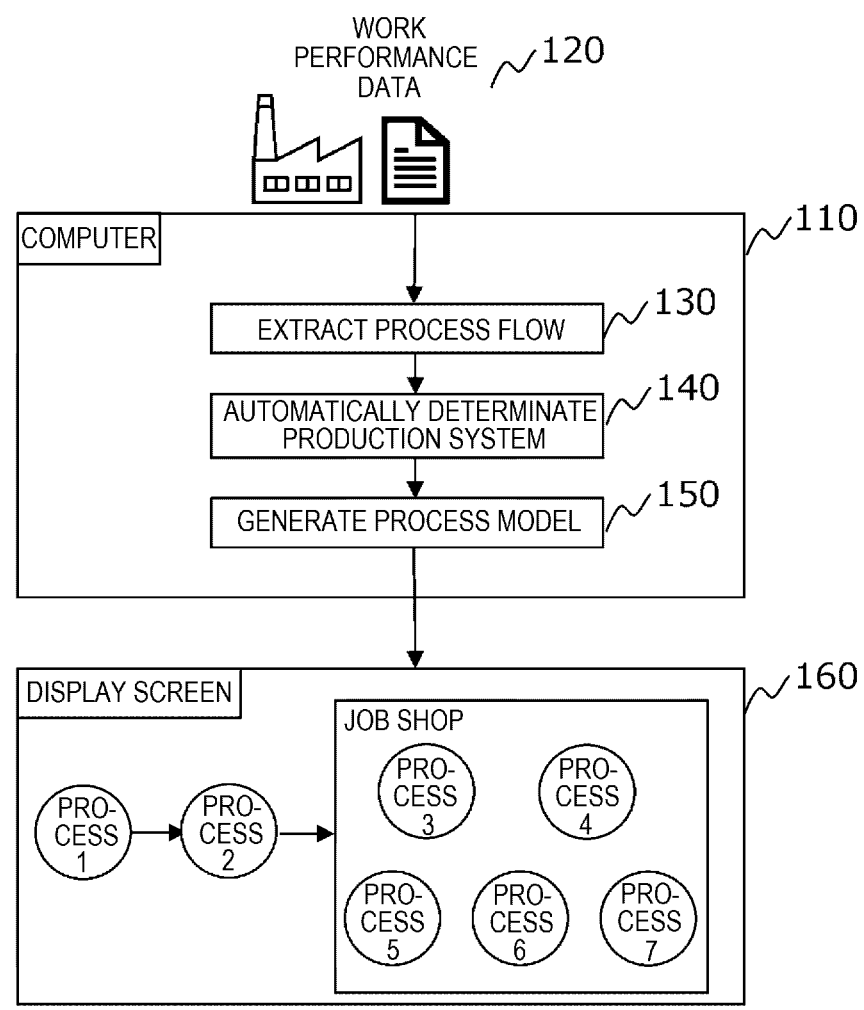

[FIG. 2]
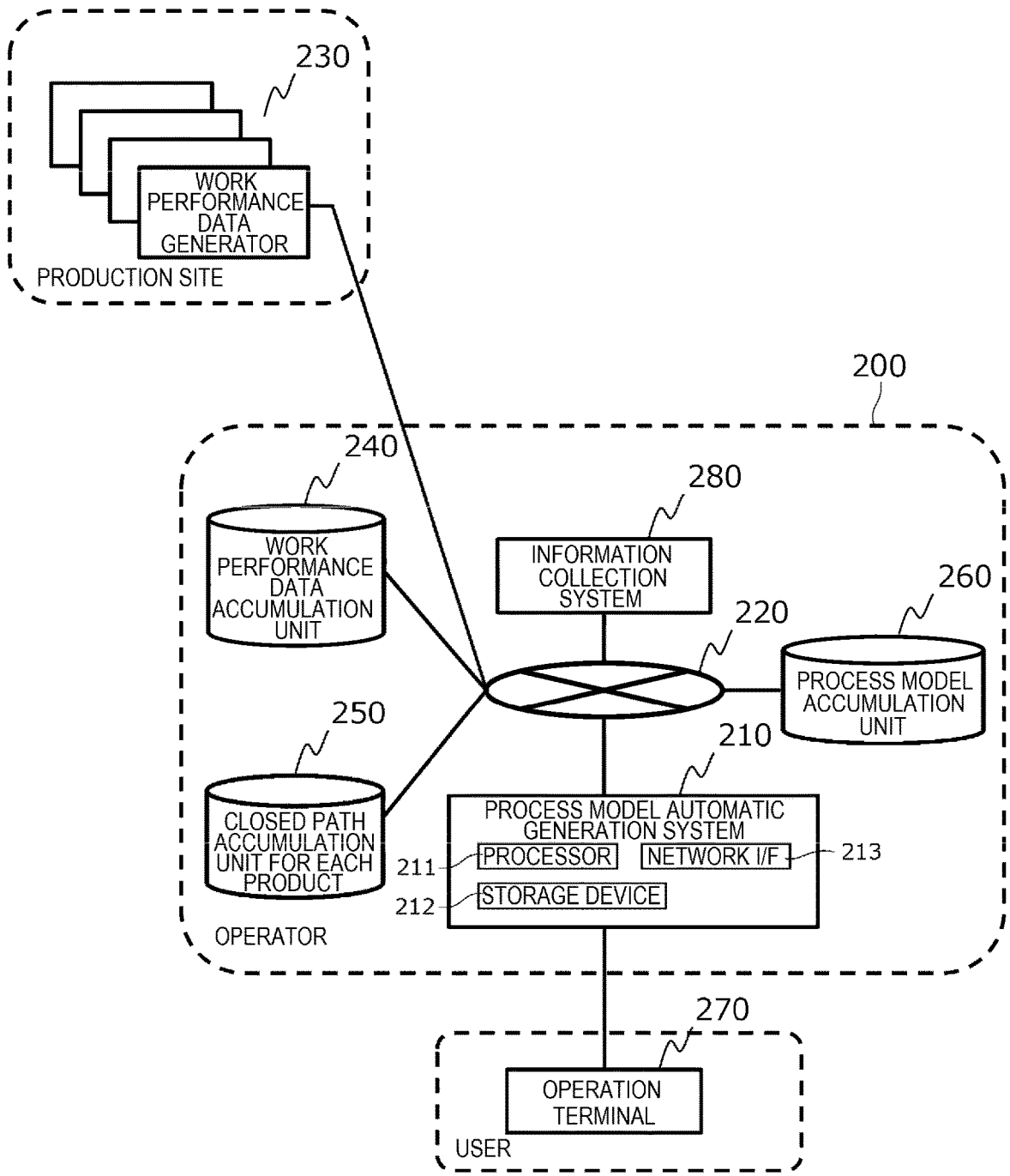

[FIG. 3]
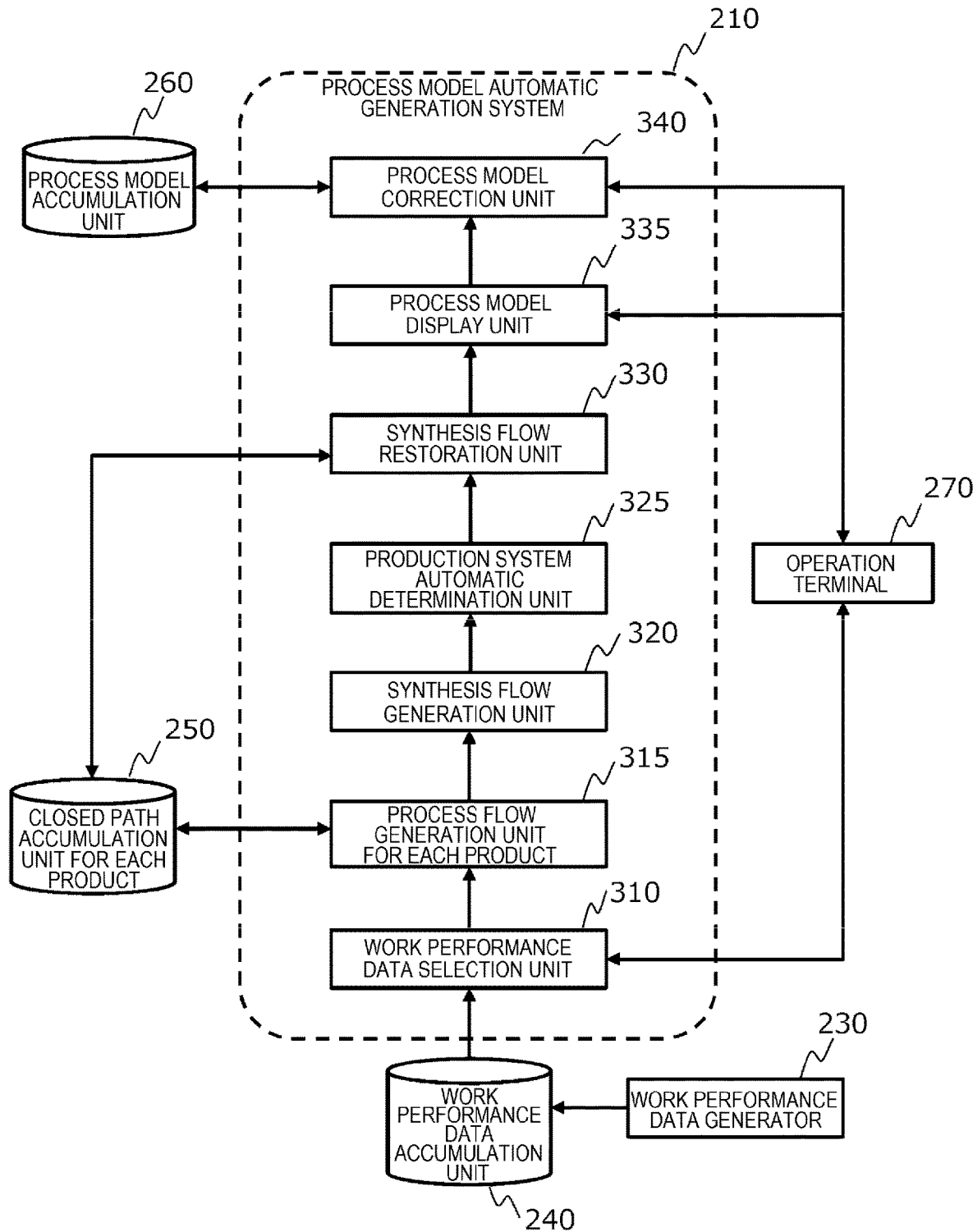

[FIG. 4]
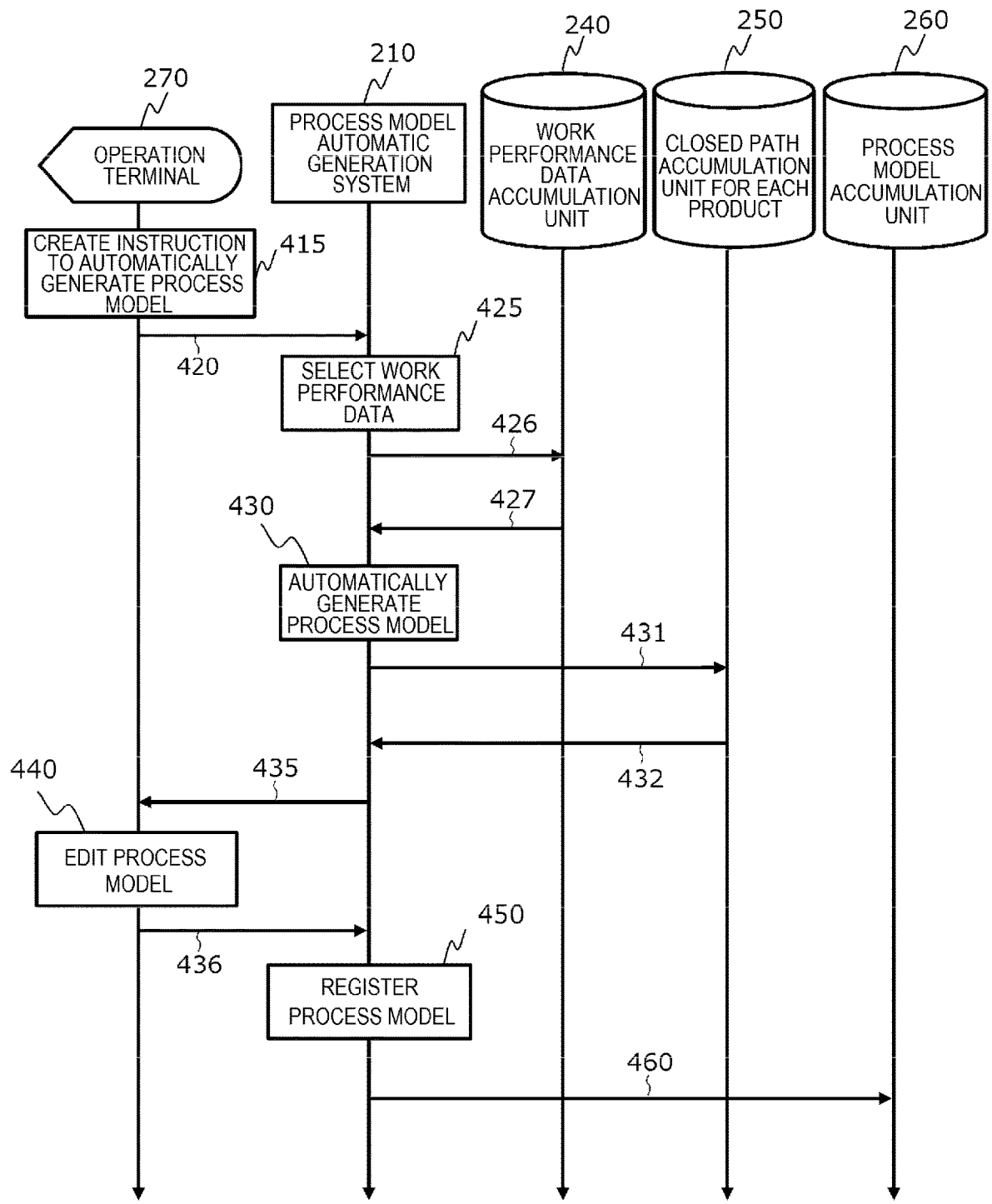

[FIG. 5]
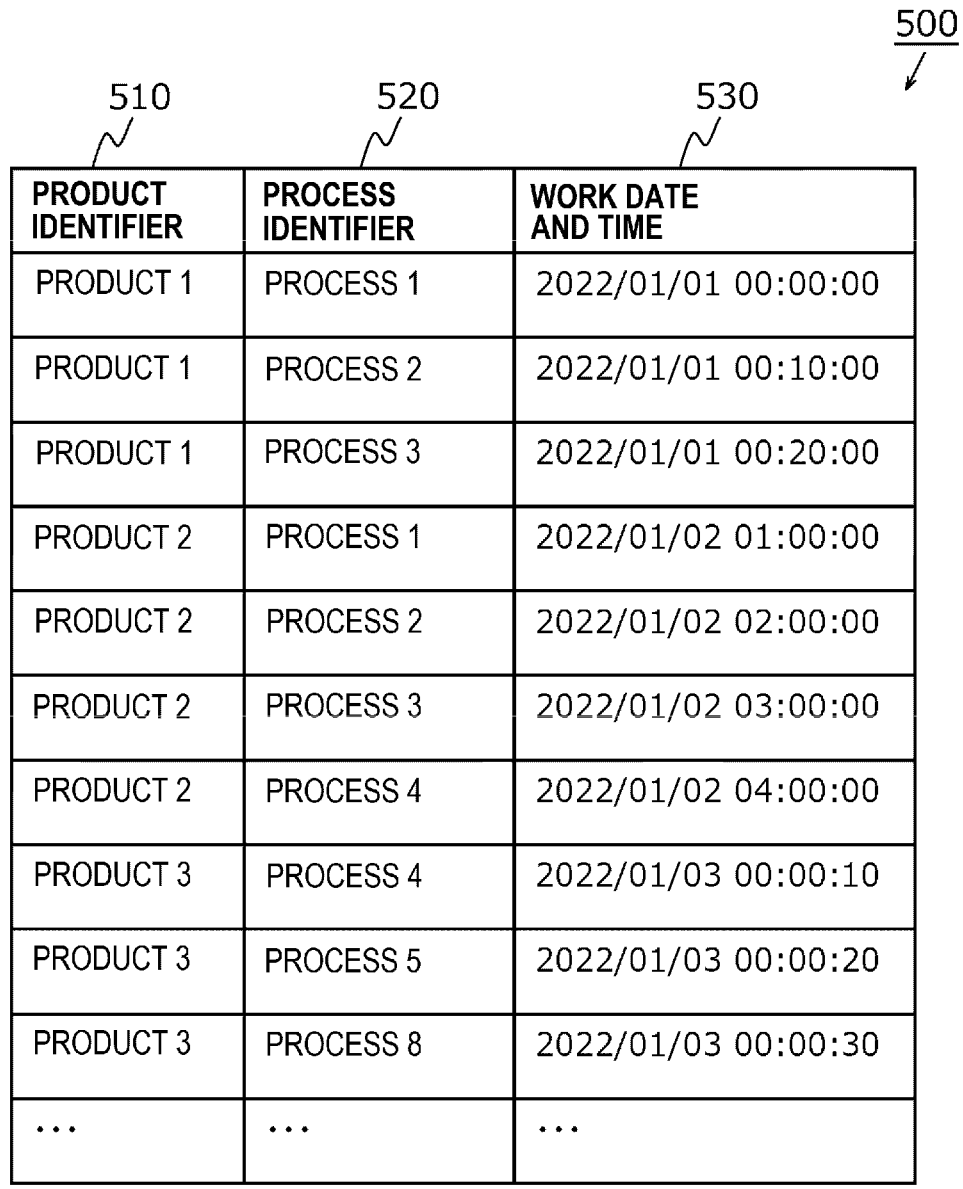
| PRODUCT IDENTIFIER | PROCESS IDENTIFIER | WORK DATE AND TIME |
|---|---|---|
| PRODUCT 1 | PROCESS 1 | 2022/01/01 00:00:00 |
| PRODUCT 1 | PROCESS 2 | 2022/01/01 00:10:00 |
| PRODUCT 1 | PROCESS 3 | 2022/01/01 00:20:00 |
| PRODUCT 2 | PROCESS 1 | 2022/01/02 01:00:00 |
| PRODUCT 2 | PROCESS 2 | 2022/01/02 02:00:00 |
| PRODUCT 2 | PROCESS 3 | 2022/01/02 03:00:00 |
| PRODUCT 2 | PROCESS 4 | 2022/01/02 04:00:00 |
| PRODUCT 3 | PROCESS 4 | 2022/01/03 00:00:10 |
| PRODUCT 3 | PROCESS 5 | 2022/01/03 00:00:20 |
| PRODUCT 3 | PROCESS 8 | 2022/01/03 00:00:30 |
| ... | ... | ... |

[FIG. 6]

| PRODUCT IDENTIFIER | PROCESS IDENTIFIER |
|---|---|
| PRODUCT 1 | PROCESS 2 |
| PRODUCT 1 | PROCESS 3 |
| PRODUCT 2 | PROCESS 3 |
| PRODUCT 2 | PROCESS 4 |
| PRODUCT 3 | PROCESS 5 |
| PRODUCT 3 | PROCESS 8 |
| ... | ... |

[FIG. 7]

| PROCESS MODEL IDENTIFIER | PREVIOUS PROCESS IDENTIFIER | NEXT PROCESS IDENTIFIER | PRODUCTION SYSTEM BETWEEN PROCESSES |
|---|---|---|---|
| MODEL 1 | PROCESS 1 | PROCESS 2 | FLOW SHOP |
| MODEL 1 | PROCESS 2 | PROCESS 3 | FLOW SHOP |
| MODEL 1 | PROCESS 3 | PROCESS 4 | FLOW SHOP |
| MODEL 1 | PROCESS 4 | PROCESS 5 | FLOW SHOP |
| MODEL 2 | PROCESS 1 | PROCESS 3 | JOB SHOP |
| MODEL 2 | PROCESS 3 | PROCESS 1 | JOB SHOP |
| ... | ... | ... | ... |

[FIG. 8]

| TYPE OF PRODUCTION SYSTEM | PROCESS FLOW |
|---|---|
| FLOW SHOP | FIXED ROUTE PATTERN (CONTINUOUS FLOW) 810<br>①→②→③→④→⑤ |
|  | ALTHOUGH FLOW IS FIXED ROUTE PATTERN, SKIPPING OF PROCESSES IS POSSIBLE (LINE FLOW) 820<br>①→②→③→④→⑤ |
| JOB SHOP | NO PATTERN EXISTS IN ROUTE 830 |

[FIG. 9]
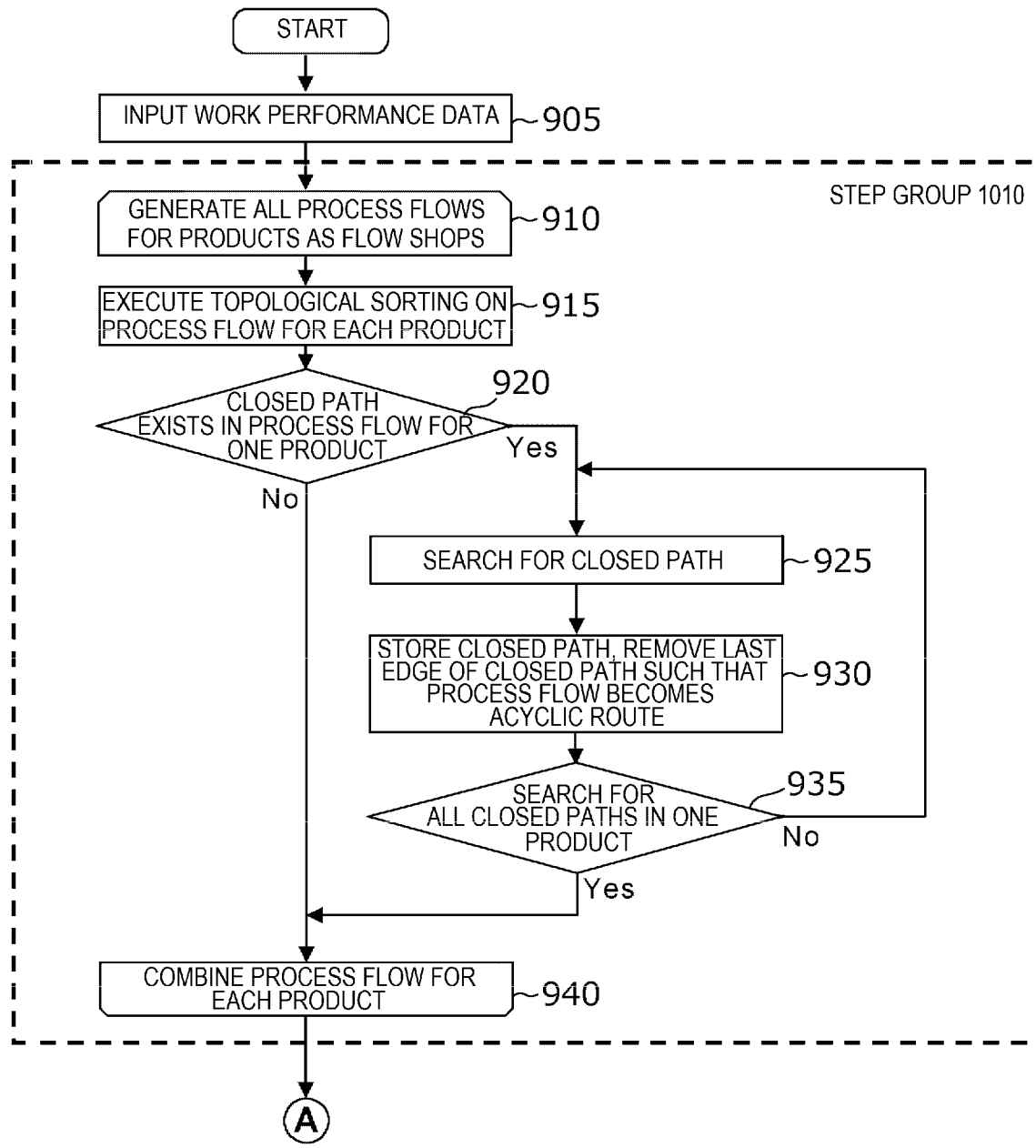

[FIG. 10]
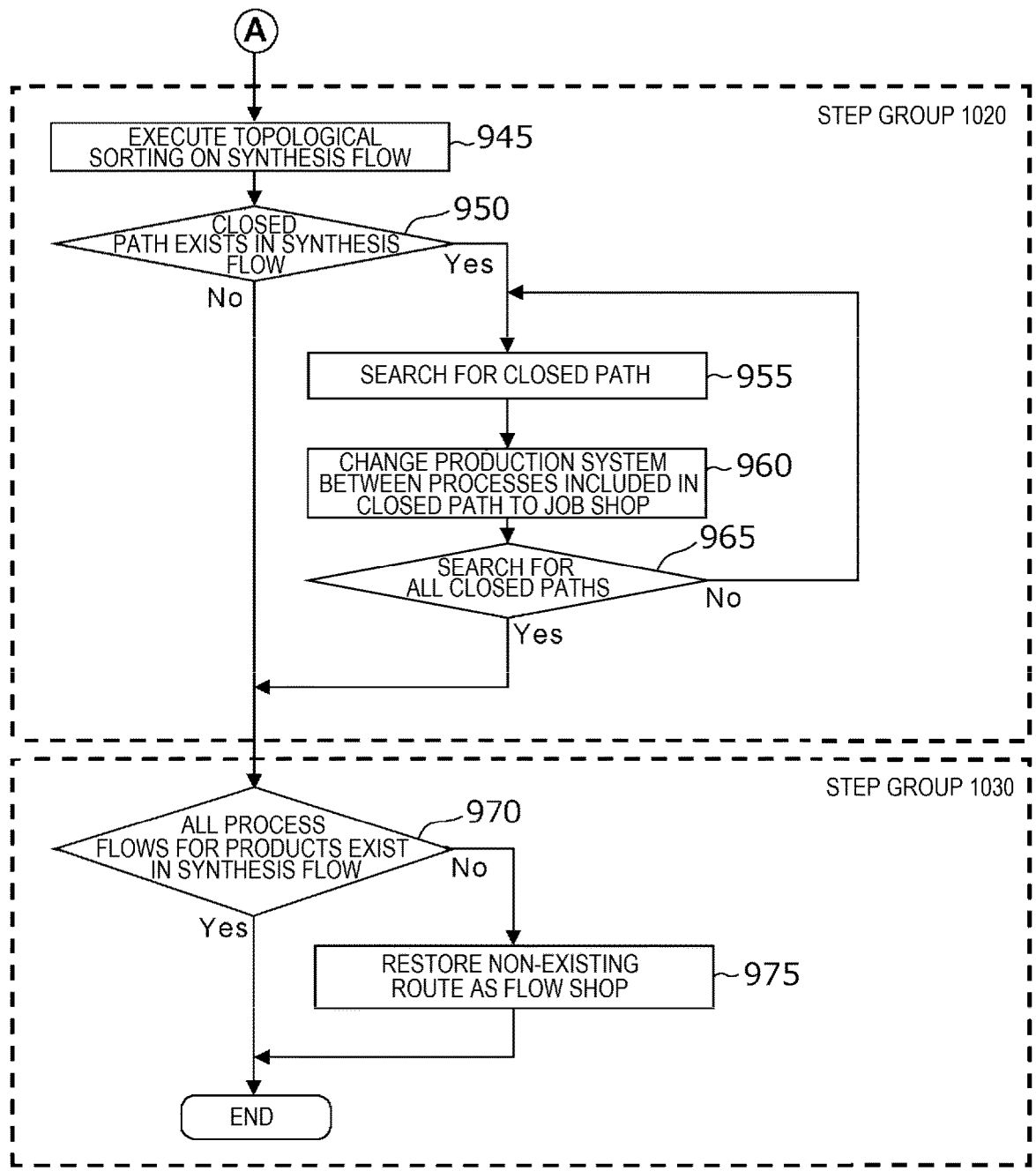

[FIG. 11]
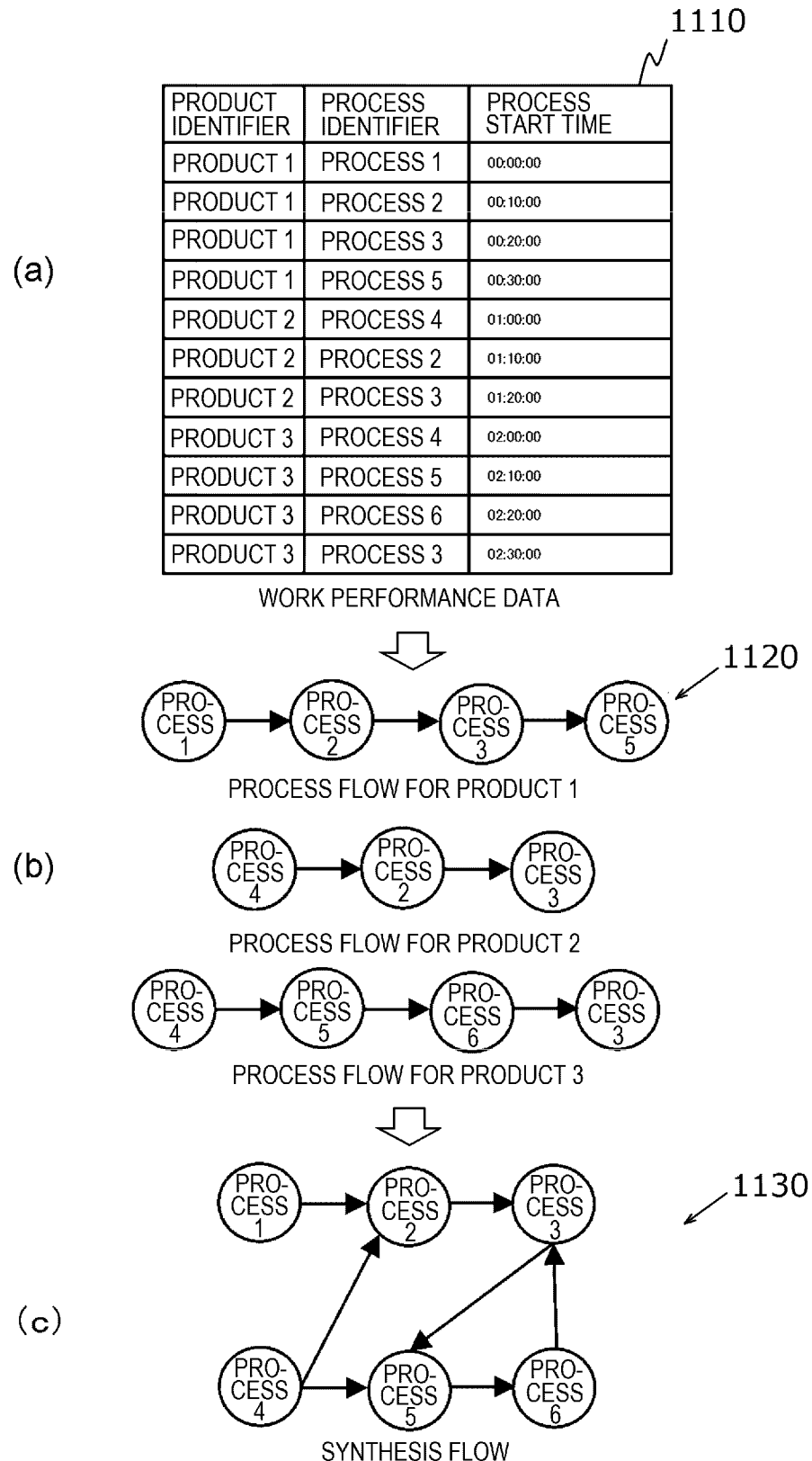

[FIG. 12]
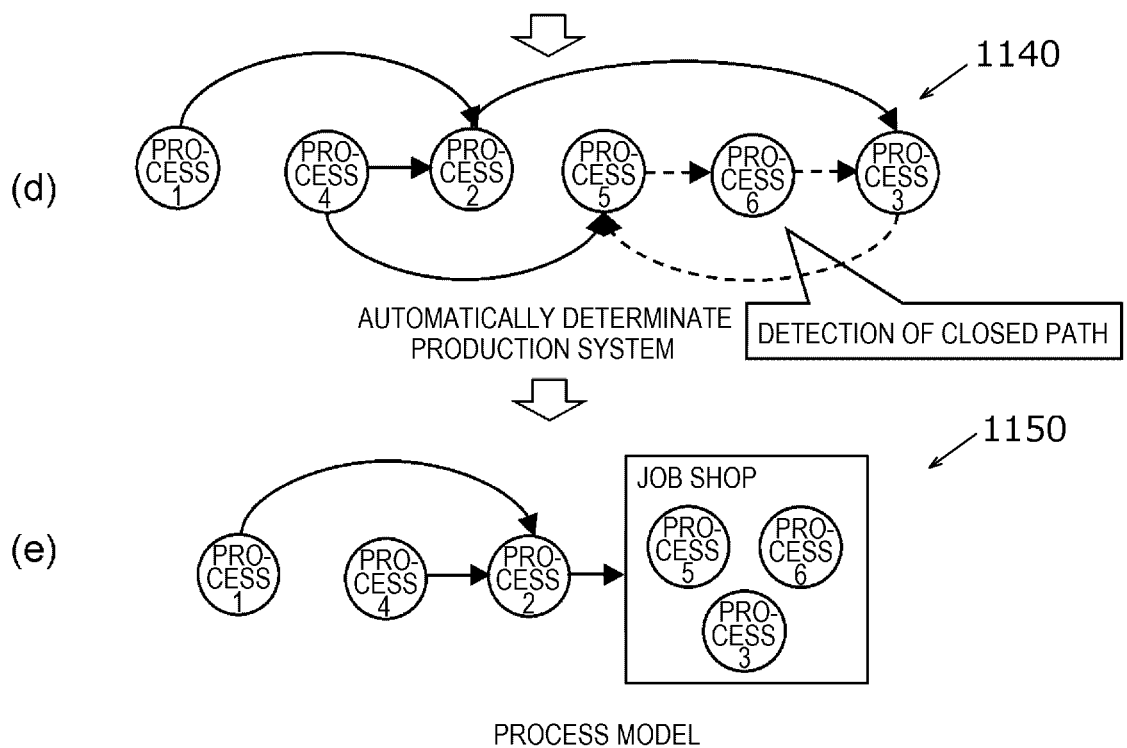

[FIG. 13]
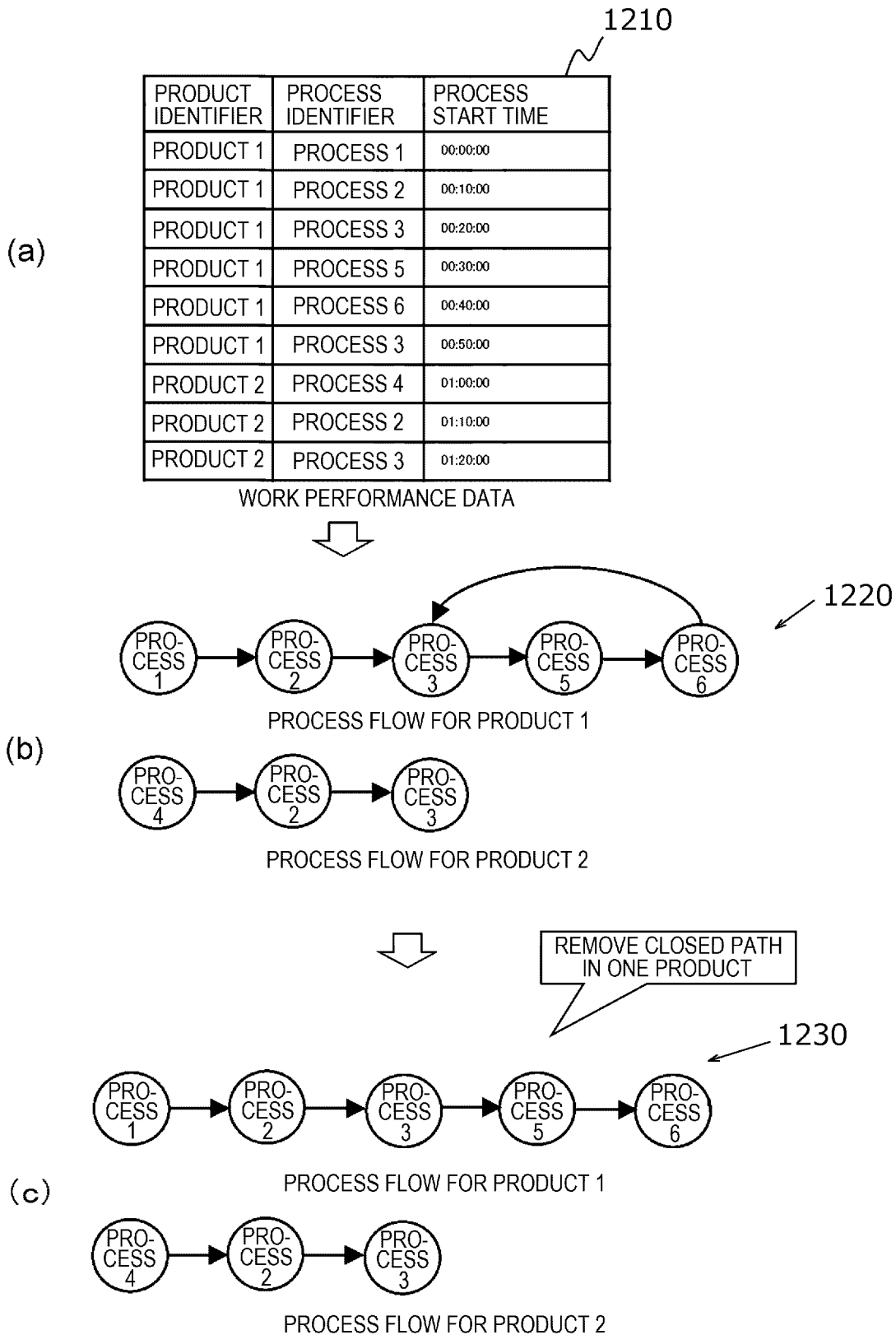

[FIG. 14]
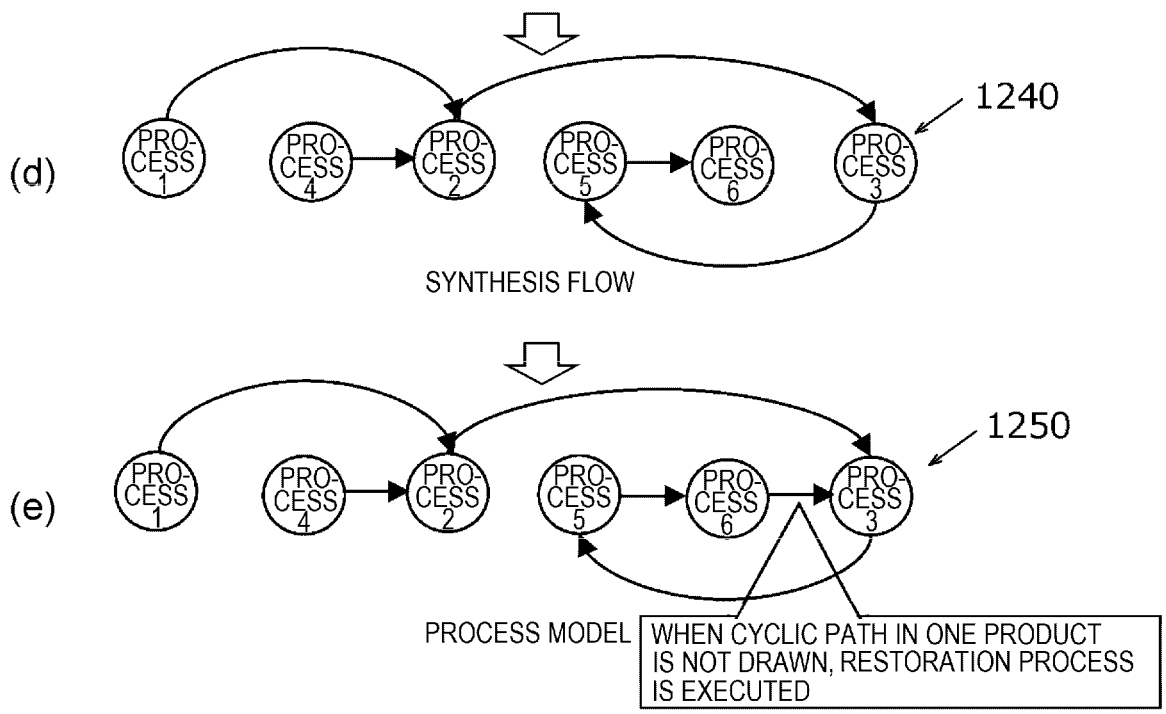

[FIG. 15]
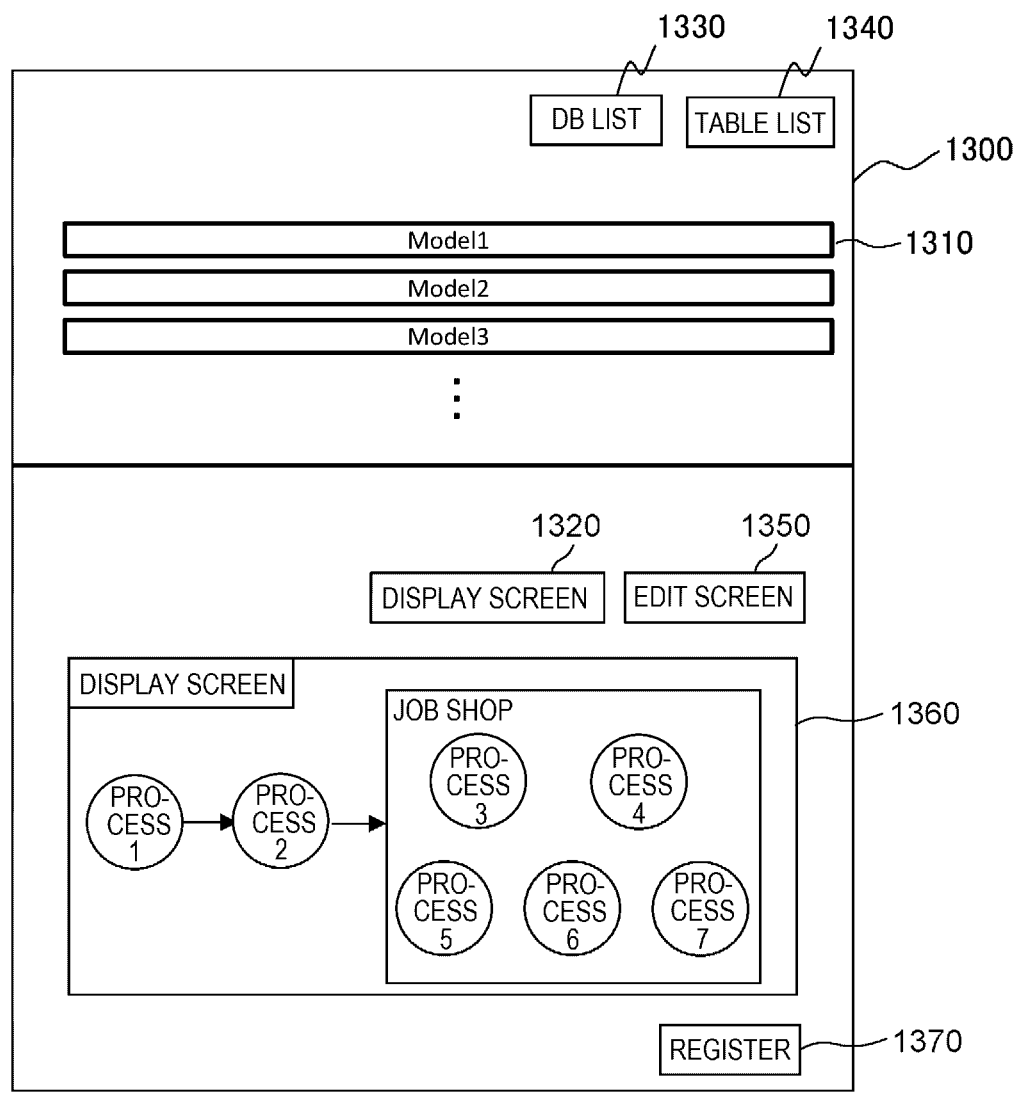

[FIG. 16]
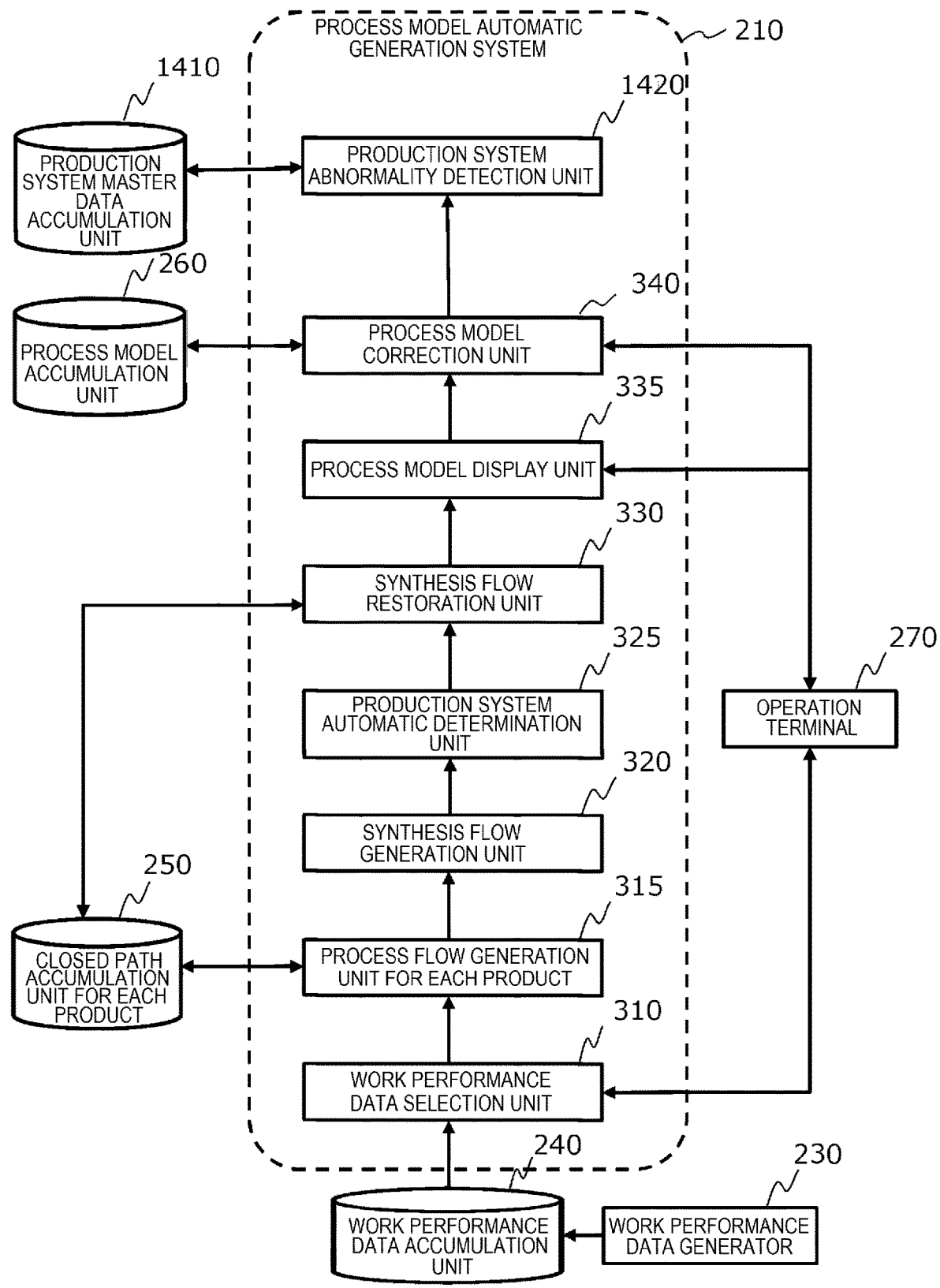

[FIG. 17]
| TYPE OF PRODUCTION SYSTEM | PROCESS FLOW |
|---|---|
| FLOW SHOP | FIXED ROUTE PATTERN (CONTINUOUS FLOW) 810  |
|  | ALTHOUGH FLOW IS FIXED ROUTE PATTERN, SKIPPING OF PROCESSES IS POSSIBLE (LINE FLOW) 820 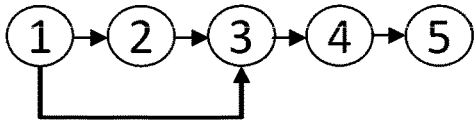 |
|  | SUPERIOR ROUTE PATTERN EXISTS (BATCH FLOW) 1510 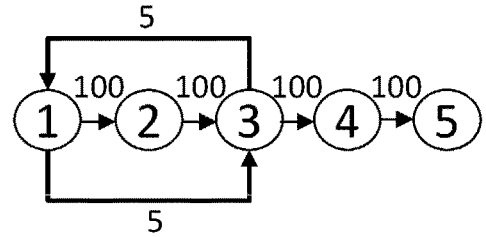 |
| JOB SHOP | NO PATTERN EXISTS IN ROUTE 830 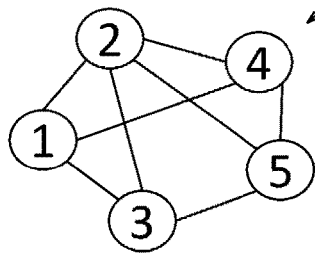 |

[FIG. 18]
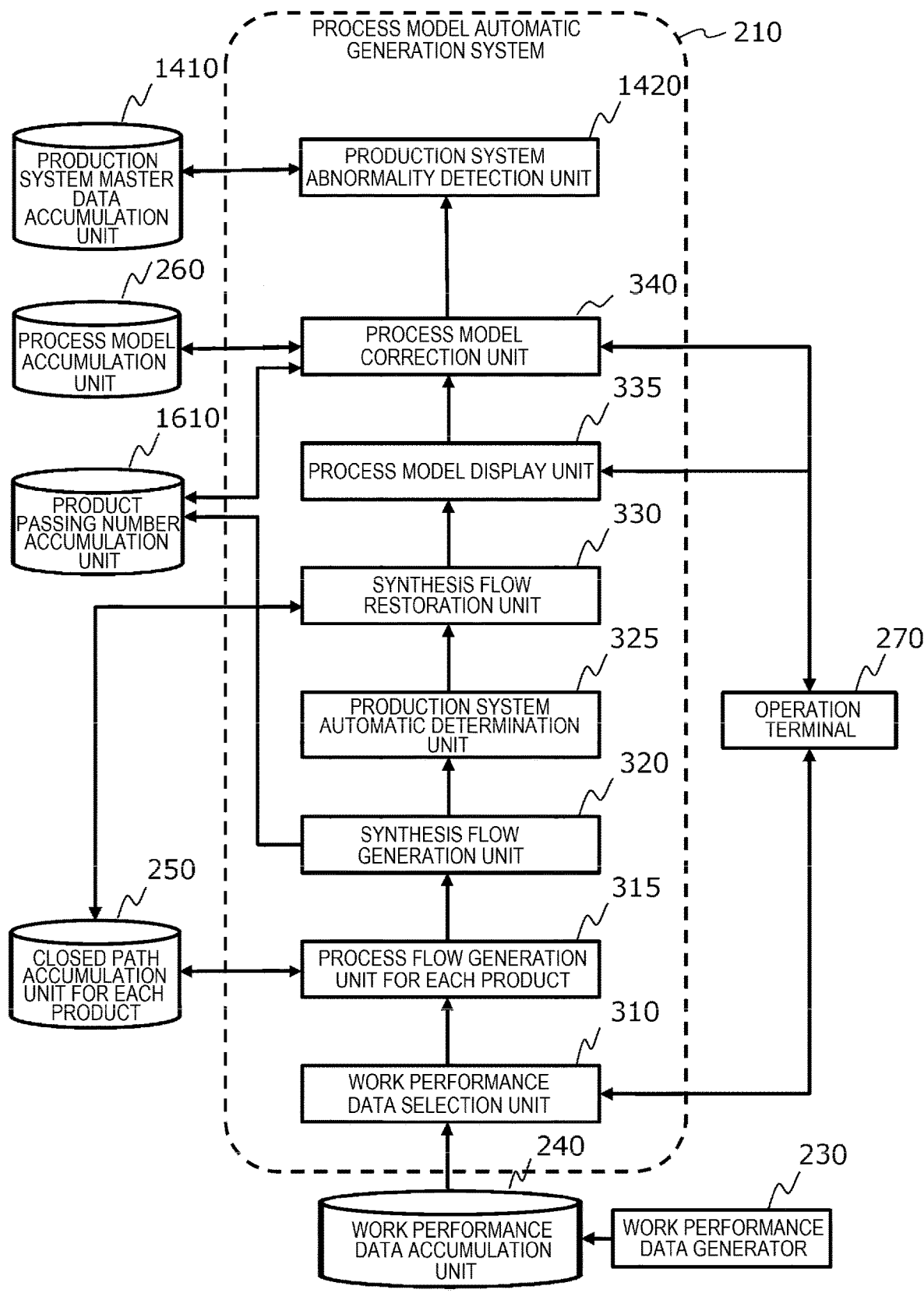

[FIG. 19]
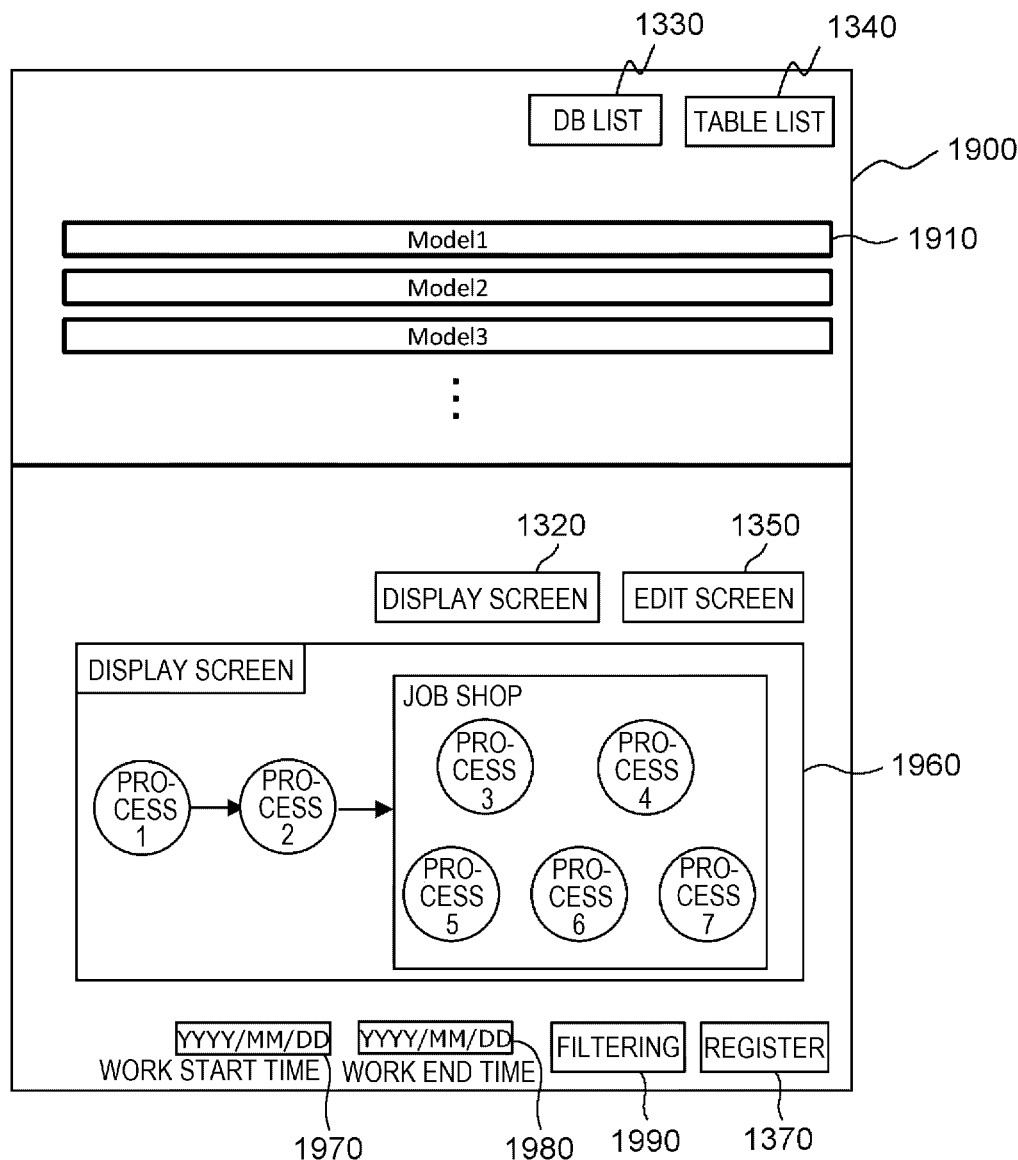

PROCESS MODEL AUTOMATIC GENERATION SYSTEM AND PROCESS MODEL AUTOMATIC GENERATION METHOD

CROSS-REFERENCE TO RELATED APPLICATION

The present application claims priority from Japanese application JP2022-113559, filed on Jul. 14, 2022, the contents of which is hereby incorporated by reference into this application.

TECHNICAL FIELD

The present invention relates to a process model generation system and a process model automatic generation method using the same.

BACKGROUND ART

In each task in a manufacturing industry, site data is generated and collected when the task is completed or a predetermined event occurs. A site worker or a data analyst analyzes the site data in order to improve work efficiency of each task. However, when departments that manage tasks are different, it may be difficult to share information among the departments. A reason is considered to be that systems for task management are different depending on departments, and the like. By analyzing the collected site data, the work efficiency of the task in the department is improved, and in order to improve the work efficiency of the entire series of task processes, cooperation among the departments is indispensable. For this purpose, not only in the department, but also the site data generated in the entire task processes are managed in association with each other, and it is necessary to execute data analysis to improve the efficiency of the entire task processes.

PTL 1 discloses an information collection and display system in which a data generator that generates site data and a storage device that stores the site data generated by the data generator are connected to each other. The information collection and display system includes an association data accumulation unit that stores association data defining association of a plurality of pieces of information included in the site data; an association data search unit that searches for second information associated with first information included in the plurality of pieces of information, based on the association data stored in the association data accumulation unit; and a user interface unit that displays a connection relation of the plurality of pieces of information associated by the association data. The association data search unit searches for the second information associated with the first information based on the association data, according to a selection of the first information in the connection relation of the plurality of pieces of information displayed on the user interface unit, and displays the first information and the second information on the user interface unit with the connection relation of the plurality of pieces of information.

CITATION LIST

Patent Literature

PTL 1: JP2019-153051A
PTL 2: JP2002-62922A
PTL 3: US2013/0208315

SUMMARY OF INVENTION

Technical Problem

When a process model is generated based on the site data generated in a production process, a flow shop and a job shop exist as major classification of a production system. The flow shop is a production system that allows processes to be executed in order (continuous flow) and some processes not to be executed (line flow). The flow shop has advantages in that a process order can be visualized and input data is simplified, whereas the flow shop has disadvantages in that as an amount of site data used to generate the process model increases, the process order becomes more complicated and adding a pattern to the process order becomes more difficult. The job shop is a production system that allows the process order to be random and some processes are not executed. The job shop has advantages in that a display screen is simplified and adding a pattern to the process order is easy, whereas the job shop has disadvantages in that the process order cannot be visualized, and information on connection between processes is required in the input data, which increases labor and input errors. The process model here refers to a model including data having a process model identifier, a previous process identifier, a next process identifier, and a production system between processes.

The information collection system disclosed in PTL 1 proposes management for information on the production process using an association data model indicating a structure of the association data defining the association of the plurality of pieces of information included in the site data generated from the tasks included in the production process and the association data, but does not mention a method for determining a production system and generating a process model.

A production line system selection method disclosed in PTL 2 discloses a technique for determining the most efficient production system among a flow shop, a GT shop, and a job shop from a path and cycle time of each product, but does not mention determination for production systems in which a plurality of production systems are mixed.

A process model generation method disclosed in PTL 3 proposes a method for generating the most efficient process model based on plan data using a process model that includes both a flow shop and a job shop, but does not mention a method for generating a process model based on performance data.

The invention has been made in view of the above problems, and one object of the invention is to automatically generate a process model combining a flow shop and a job shop using work performance data.

Another object of the invention is to automatically create a process model in which a flow shop and a job shop are mixed by creating a process flow as a flow shop from a work process of each product included in the work performance data and correcting a portion in which a closed path of the process flow exists to a job shop.

Solution to Problem

In order to achieve the above objects, the invention automatically generates a process flow for each product based on work performance data collected at a production site. Here, when the process model for each product is generated, a process model is automatically generated in accordance with a basic rule that a portion in which a closed path is formed is determined to be a job shop, and other portions are determined to be a flow shop. A process model automatic generation system includes: a process flow generation unit that generates a process flow for each product based on work performance data collected at a production site; a synthesis flow generation unit that generates a synthesis flow by combining a plurality of process flows; a production system automatic determination unit that determines a production system between processes from a structure of the synthesis flow; and a synthesis flow restoration unit that generates a process model including a flow shop and a job shop based on the determined production system. The process model automatic generation system further includes: a work performance data accumulation unit that accumulates the collected work performance data; and a work performance data selection unit that selects a target to be used as a material for generating a process model from the work performance data stored in the work performance data. The synthesis flow generation unit generates a synthesis flow using the work performance data selected from the work performance data. When a closed path exists in a flow in generating the process flow, the process flow generation unit executes a preprocess for deleting a part of the flow such that no closed path exists in the process flow, and the deleted flow is restored by the synthesis flow restoration unit after being synthesized. When a closed path exists in the synthesis flow, the production system automatic determination unit determines the closed path as a job shop.

According to another feature of the invention, the process model generated by the synthesis flow restoration unit is displayed on an operation terminal as a process model including a flow shop and a job shop. The displayed process model is made amenable to manual correction by a user, and an interface for enabling the correction work is provided. A function of each unit of the process model automatic generation system is implemented by a processor executing a specific computer program.

Advantageous Effects of Invention

According to the invention, by counting the work performance data acquired at the production site, it is possible to implement a process model automatic generation system capable of greatly simplifying data input work by a worker and automatically generating a process model combining a flow shop and a job shop. It solves a problem in the related art that it is inefficient to build a process model only with a process model of a line or a process model of a job shop only, both processes can be mixed, and a system corresponding to various existing processes can be implemented. Further, since a business order pattern of the automatically generated process model can be easily added and the correction work and the correction to the job shop or the like can be easily performed, a user-friendly system can be implemented.

BRIEF DESCRIPTION OF DRAWINGS

FIG. 1 is a diagram showing an outline of an embodiment of the invention.
FIG. 2 is a block diagram showing a configuration example of a network to which an overall system 200 for automatically generating a process model according to a first embodiment is applied.
FIG. 3 is a block diagram showing a functional configuration example of the overall system 200 in FIG. 2.
FIG. 4 is a diagram showing an example of an operation procedure from creation of a model based on work performance data to registration of the model in a process model accumulation unit by the overall system 200 in FIG. 2.
FIG. 5 is a diagram showing an example of work performance data accumulated in a work performance data accumulation unit in FIG. 2.
FIG. 6 is a diagram showing an example of closed path data accumulated in a closed path accumulation unit for each product in FIG. 2.
FIG. 7 is a diagram showing an example of process model data accumulated in the process model accumulation unit in FIG. 2.
FIG. 8 is a diagram showing examples of a flow shop and a job shop.
FIG. 9 is a flowchart showing a procedure for generating a process model including a flow shop and a job shop by a process model automatic generation system 210 in FIG. 2.
FIG. 10 is a diagram in which the procedure for generating a process model including a flow shop and a job shop in FIG. 9 is divided into three steps.
FIG. 11 is a diagram showing a specific example of automatic determination of a process model of the process model automatic generation system 210 in FIG. 2 (part 1).
FIG. 12 is a diagram showing a specific example of automatic determination of the process model of the process model automatic generation system 210 in FIG. 2 (part 2).
FIG. 13 is a diagram showing a specific example of automatic determination of a process model when a closed path exists in one product of the process model automatic generation system 210 in FIG. 2 (part 1).
FIG. 14 is a diagram showing a specific example of automatic determination of the process model when the closed path exists in one product of the process model automatic generation system 210 in FIG. 2 (part 2).
FIG. 15 is a diagram showing an example of a screen displaying the process model including a flow shop and a job shop of the process model automatic generation system 210 in FIG. 2.
FIG. 16 is a block diagram showing a functional configuration example of a process model automatic generation system having a function of detecting an abnormality in a production system in a process model automatic generation system according to a second embodiment.
FIG. 17 is a diagram showing examples of a flow shop and a job shop in a process model automatic generation system according to a third embodiment.
FIG. 18 is a block diagram showing a functional configuration example of the process model automatic generation system according to the third embodiment.
FIG. 19 is a diagram showing an example of a user interface that provides a function of filtering a process model in a period of a process model automatic generation system according to a fourth embodiment.

DESCRIPTION OF EMBODIMENTS

First Embodiment

Hereinafter, embodiments of the invention will be described with reference to the drawings. The embodiments described below do not limit the invention according to the claims, and all elements and combinations thereof described in the embodiments are not necessarily essential to the solution of the invention.

FIG. 1 is a diagram showing an outline of an embodiment of the invention. A computer 110 extracts a process flow from work performance data 120 accumulated in a production site or the like (130). Next, a production system between processes is automatically determined based on a structure of the extracted process flow (140), and a process model including a flow shop and a job shop is generated (150). Further, an interface is provided that displays the flow shop and the job shop in a distinguishable manner by drawing the job shop as one node (160). Steps 130 to 160 executed by the computer 110 are implemented in software by executing a program.

[Block Diagram]

FIG. 2 is a block diagram showing a configuration example of an overall system 200 to which a process model automatic generation system 210 in a first embodiment is applied. Here, the process model automatic generation system 210 corresponds to a core part of the computer 110 shown in FIG. 1. In FIG. 2, the process model automatic generation system 210 is connected to a network 220. One or more work performance data generators 230, one or more work performance data accumulation units 240, a closed path accumulation unit 250 for each product, and a process model accumulation unit 260 are connected to the network 220. These components form the overall system 200. The process model automatic generation system 210, the work performance data generators 230, the work performance data accumulation units 240, the closed path accumulation unit 250 for each product, and the process model accumulation unit 260 are connected to an information collection system 280 via the network 220. In the present specification, the "process model automatic generation system", which is the name of the invention, basically refers to a portion of 210, and the overall system 200 may be referred to as a "process model automatic generation system" in a broad sense.

An operation terminal 270 for operating the process model automatic generation system 210 is connected to the process model automatic generation system 210. The operation terminal 270 is used by various users such as an administrator who manages the process model automatic generation system 210, a monitoring person who monitors the process model automatic generation system 210, and a user who uses the process model automatic generation system 210, and is one or a plurality of information terminal devices. In the example of FIG. 2, the operation terminal 270 has a configuration different from that of the overall system 200 by being shown in dotted lines different from dotted lines of the overall system 200, and a part or the whole of the operation terminal 270 may be provided in the overall system 200. By connecting the process model automatic generation system 210 and the operation terminal 270 via the network 220, the process model automatic generation system 210 may be accessed from any point outside the overall system 200.

The work performance data generator 230 is a device that monitors work at the production site and generates an output indicating a progress status and a progress result. The work performance data generator 230 may be, for example, a bar code reader, a personal computer (PC), or a server that acquires a work log of a worker, a machine that processes a component or assembles a finished product, or a sensor that collects inspection information of a radio frequency identifier (RFID) attached to the component or the finished product. A large number of pieces of work performance data are provided at the production site, and the collected performance data are accumulated in a system (not shown) that manages the production site. Further, the work performance data collected or generated by the work performance data generator 230 is transmitted to and accumulated in the work performance data accumulation unit 240 via the network 220.

The work performance data accumulation unit 240 is, for example, a storage device such as a server or a memory, and accumulates the work performance data received from the work performance data generator 230 via the network 220. The closed path accumulation unit 250 for each product is, for example, a storage device such as a server or a memory, and accumulates closed path data of a process model for each product.

The process model accumulation unit 260 is, for example, a storage device such as a server or a memory, and accumulates process model data generated by the process model automatic generation system 210. The information collection system 280 collects information on the implementation of a process, for example, an implementation record of a process.

[System Configuration]

Next, main functions of the process model automatic generation system 210 will be described. The process model automatic generation system 210 includes a processor 211 such as a central processing unit (CPU) that executes overall control of the process model automatic generation system 210, a storage device 212 that stores various processing programs for implementing functions of the process model automatic generation system 210, a network interface (I/F) 213, and the like. The storage device 212 is implemented by using a known storage device such as a read only memory (ROM) that stores various processing programs and the like, a random access memory (RAM) that temporarily stores information, or a hard disk drive (HDD). The processor 211 executes various processing programs stored in the storage device 212, thereby implementing functions of the invention described below. A configuration of the process model automatic generation system 210 is not limited to the illustrated example, and the programs may be partially or entirely introduced from another device via a non-transitory storage medium or a communication line.

FIG. 3 is a block diagram showing functions of the process model automatic generation system 210. In the process model automatic generation system 210, functions of a work performance data selection unit 310, a process flow generation unit 315 for each product, a synthesis flow generation unit 320, a production system automatic determination unit 325, a synthesis flow restoration unit 330, a process model display unit 335, and a process model correction unit 340 are implemented by computer programs. As mentioned above, the process model automatic generation system 210 is connected to the work performance data generator 230, the work performance data accumulation unit 240, the closed path accumulation unit 250 for each product, and the process model accumulation unit 260 via the network 220.

The process model automatic generation system 210 is connected to the operation terminal 270. Here, a flow of information by a connection path is indicated by a direction of an arrow. The operation terminal 270 provides the user with a function of selecting work performance data to be used for creating a process model by the work performance data selection unit 310, a function of displaying the generated process model by the process model display unit 335, and a function of correcting the process model by the process model correction unit 340.

First, the work performance data selection unit 310 of the process model automatic generation system 210 acquires work performance data for generating a process model designated by the user using the operation terminal 270, and selects work performance data to be used from the work performance data registered in the work performance data accumulation unit 240. The process flow generation unit 315 for each product generates a process flow for each product by reading, from the work performance data accumulation unit 240, the work performance data selected by the work performance data selection unit 310. At this time, in a production system of a process flow, a process flow is generated as a flow shop. When a closed path exists in a process flow for each product, a product identifier and closed path data are accumulated in the closed path accumulation unit 250 for each product, and a preprocess is executed such that no closed path exists in the process flow for each product.

The synthesis flow generation unit 320 combines the process flows for the product generated by the process flow generation unit 315 for each product to generate a synthesis flow. Next, the production system automatic determination unit 325 determines which of a flow shop and a job shop the production system between processes corresponds to, based on a structure of the synthesis flow generated by the synthesis flow generation unit 320.

The synthesis flow restoration unit 330 executes a process for restoring a process flow preprocessed by the process flow generation unit 315 for each product as a flow shop based on the process model generated by the production system automatic determination unit 325. At this time, a restoration process may be executed using data stored in the closed path accumulation unit 250 for each product. The process model display unit 335 transmits, to the operation terminal 270, a process model including a flow shop and a job shop restored by the synthesis flow restoration unit 330. A display screen 1300 (described later with reference to FIG. 15) and the like are displayed on the operation terminal 270.

The process model correction unit 340 provides a function of manually correcting a process model when the process model is different from the intended process model after the user confirms the generated process model in the process model display unit 335. When the manual correction of the process model is completed, process model data is transmitted to the process model accumulation unit 260.

<Operation Procedure>

FIG. 4 is a diagram showing an example of an operation procedure until the process model automatic generation system 210 automatically generates a process model including a flow shop and a job shop and registers the process model in the process model accumulation unit 260. First, the user who uses the process model automatic generation system 210 issues an instruction to automatically generate a process model to the process model automatic generation system 210 using the operation terminal 270 (steps 415 and 420). Next, the process model automatic generation system 210 selects work performance data to be used and transmits a command for reading the corresponding work performance data to the work performance data accumulation unit 420 (step 426), and the process model automatic generation system 210 acquires the corresponding work performance data (step 427).

Next, the process model automatic generation system 210 executes an automatic generation process of a process model using the selected work performance data (step 430). Here, the process model automatic generation 430 indicates functions of the process flow generation unit 315 for each product, the synthesis flow generation unit 320, the production system automatic determination unit 325, the synthesis flow restoration unit 330, and the process model display unit 335 in FIG. 3. In the process model automatic generation 430, the process flow generation unit 315 for each product transmits a closed path for each product to a closed path accumulation unit 435 for each product (step 431). In the process model automatic generation 430, the synthesis flow restoration unit 330 (see FIG. 3) acquires closed path data from the closed path accumulation unit 435 for each product (step 432), and executes a restoration process of the synthesis flow. The process model generated in the process model automatic generation 430 is output by the operation terminal 270 (step 435).

The user who uses the process model automatic generation system 210 edits the process model displayed on the operation terminal 270, that is, a result generated in the process model automatic generation 430 (step 440). The process model edited by the user is transmitted to the process model automatic generation system 210 (step 436) and registered in the process model accumulation unit 260 (steps 450 and 460).

[Data Content]

FIG. 5 is a diagram showing an example of work performance data 500 registered in the work performance data accumulation unit 240. The work performance data 500 includes a product identifier 510 that uniquely identifies a product, a process identifier 520 that uniquely identifies a process, a work date and time 530 indicating a date and time when the process is executed, and the like. The product identifier 510 shown in FIG. 5 means a specific vehicle model (vehicle name) in an example of an automobile manufacturer, and an identifier for identifying the vehicle model (vehicle name) and a production individual is assigned to the product identifier 510. In this example, a product 1 indicates production of a first vehicle model, a product 2 indicates production of a second vehicle model, and a product 3 indicates production of a third vehicle model. The process identifier 520 is an identifier (a process name, an identification number, or the like) for identifying a process of a production process. The work date and time 530 stores a date and time when the work is performed, and may have a plurality of pieces of information such as a work start date and time and a work end date and time.

FIG. 6 is a diagram showing closed path data 600 for each product registered in the closed path accumulation unit 250 for each product. The closed path data 600 for each product includes a product identifier 610 that uniquely identifies a product and a process identifier 620 that uniquely identifies a process.

FIG. 7 is a diagram showing process model data 700 registered in the process model accumulation unit 260. The process model data 700 includes a process model identifier 710 that uniquely identifies a process model, a previous process identifier 720 that uniquely identifies a previous process, a next process identifier 730 that uniquely identifies a next process, and a production system 740 between processes indicating a production system between the previous process and the next process.

[Flow Shop and Job Shop]

FIG. 8 is a diagram showing examples of a flow shop and a job shop according to the present embodiment. The flow shop is characterized in that the processes are executed in order and some processes are permitted not to be executed. In the present embodiment, a production system in which both a continuous flow 810 and a line flow 820 are taken into consideration is defined as a flow shop. In the example of FIG. 8, a process order of the flow shop may be 1→2→3→4→5, 1→3→4→5, or the like. The job shop is characterized in that the processes are executed in random order and some processes are permitted not to be executed. In the example of FIG. 8, a process order of a job shop 830 may be 1→2→4→5→3, 3→2→5→4→1, or the like.

<Flowchart>

FIGS. 9 and 10 are flowcharts showing procedures when the process model automatic generation system 210 executes the process model automatic generation. The procedures shown in the flowcharts are implemented by a computer constituting the process model automatic generation system 210 executing a computing program. Here, a process model is generated by generating a process flow for each product as a flow shop and then changing a production system between processes in a closed path in a synthesis flow to a job shop. Alternatively, a process model may be generated by generating all process flows for products as job shops and then changing, to a flow shop, the production system between processes other than the closed path in the synthesis flow. The procedures shown in FIGS. 9 and 10 correspond to a series of processes from the work performance data selection unit 310 to the process model display unit 335 of the process model automatic generation system 210 shown in FIG. 3.

The flowcharts mainly include three step groups 1010, 1020, and 1030. The step group 1010 includes processes executed on the process flow for each product, and is a part that executes a preprocess for not determining a closed path in the process flow of one product to be a job shop. The step group 1020 shown in FIG. 10 includes processes executed on a synthesis flow obtained by combining process flows for all products, and is a part that executes a process for automatically determining a production system between processes as a flow shop or a job shop based on a path structure of a synthesis flow obtained by combining all process flows for products. The step group 1030 includes processes executed on the synthesis flow obtained by combining all process flows for products, and is a part that executes a process for restoring, as flow shops, paths removed in the preprocess of the step group 1010.

In FIG. 9, first, the process model automatic generation system 210 inputs the work performance data selected by the work performance data selection unit 310 (step 905). Next, the process flow generation unit 315 for each product generates all process flows for products as flow shops using the work performance data selected by the work performance data selection unit 310 (step 910).

Next, the process flow generation unit 315 executes closed path detection of the process flow for each product (step 915). For the closed path detection, for example, topological sorting can be used. The topological sorting is a well-known method in graph theory in which nodes of a directed acyclic graph are ordered and arranged such that any node comes before a node ahead of an output edge of the node. Since the topological sorting can efficiently execute alignment of process flows and the closed path detection, the topological sorting is suitable for the closed path detection of the process flow for each product. Next, it is determined whether a closed path exists in the process flow for each product (step 920). When no closed path exists, the process proceeds to step 940. When a closed path exists, a closed path is searched (step 925), after closed path data is stored in the closed path accumulation unit 250 for each product, a part of the closed path is deleted such that the process flow for each product becomes an acyclic path (step 930). In the present embodiment, a last edge constituting the closed path is deleted. This process is a preprocess for not determining a cyclic path in one product as a job shop, and the processes in steps 925 to 935 are repeated until the process flow for each product becomes an acyclic graph.

Next, the synthesis flow generation unit 320 generates a synthesis flow by combining a process flow for each product (step 940). As described above, the processes in steps 910 to 940 are repeated for the product 1, the product 2 . . . and so on, so that a synthesis flow for a product is generated. In FIG. 9, obliquely cut upper corners of a rectangular box shown in step 910 and obliquely cut lower corners of a box in step 940 mean that steps 910 to 940 are repeated a plurality of times.

Proceeding to FIG. 10, the production system automatic determination unit 325 executes closed path detection of the synthesis flow by using the topological sorting with respect to the synthesis flow (step 945). For the closed path detection, the topological sorting is not necessarily used, and a method for sorting other directed acyclic graphs may be used. Next, whether a closed path is detected is determined as a result of the topological sorting (step 950). When no closed path exists in the synthesis flow, the process proceeds to step 970, and when a closed path exists in the synthesis flow, a closed path is searched (step 955). The production system between processes in the closed path is changed from the flow shop to the job shop (step 960). Processes in steps 955 and 960 are repeated until the search for all closed paths is completed (step 965).

Next, the synthesis flow restoration unit 330 determines whether all paths existing in the process flow for each product exist in the synthesis flow (step 970). When a path existing in the process flow for each product exists in the synthesis flow, the process ends as it is, and when no path exists, the corresponding edge, that is, the non-existing route is restored as a flow shop (step 975), and the process ends.

[Automatic Determination of Production System]

FIG. 11 and FIG. 12 are diagrams each showing a specific example of automatic determination of a process model. First, the process model automatic generation system 210 reads, from the work performance data accumulation unit 240 (see FIG. 2), work performance data 1110 of a product for which a process model is to be created, and generates a process flow for each product as shown in (b) of FIG. 11 (1120). In the work performance data 1110 shown in (a) of FIG. 11, processes of a first product (product 1), processes of a second product (product 2), and processes of a third product (product 3) among the same products are stored.

In the generation of the process flow for each product (step 1120), a process flow for the product 1, a process flow for the product 2, and a process flow for the product 3 are created in accordance with the work performance data 1110. As can be seen from step 1120, all of the products 1 to 3 can be displayed as flow shops, but their execution orders are different from one another.

Next, by combining the process flows for the products 1 to 3, a synthesis flow of these process flows is generated as shown in (c) of FIG. 11 (step 1130). By generating step 1130, the following rule of an execution order can be confirmed: the process 2 is always executed after the process 1, the process 3 is always executed after the process 2, the process 2 is executed after the process 4, but the process 5 is executed . . . (the same applies hereinafter).

Next, as shown in (d) of FIG. 12, the closed path of the synthesis flow is automatically determined as a job shop and the others are automatically determined as flow shops (step 1140). Here, a closed path is detected by executing topological sorting. (d) of FIG. 12 shows the synthesis flow created in step 1130 as a linear flow. By rewriting the synthesis flow in this way, it can be detected that a portion indicated by dotted lines, that is, the process 5→the process 6→the process 3→the process 5 . . . forms a closed path. Therefore, the process model automatic generation system 210 converts the process model as shown in (e) of FIG. 12 on the assumption that the process 5, the process 6, and the process 3 included in the closed path are work performed in the job shop (step 1150). As described above, in accordance with a procedure supported by steps 1120 to 1150, finally, a process model combining the flow shop and the job shop as shown in step 1150 is automatically generated.

Next, a specific example of automatic determination of a process model of another product will be described with reference to FIGS. 13 and 14. This example is an example of automatic determination of a production system of a process model in a case where a closed path exists in one product. When a closed path exists in one product, such a path is determined to be a return work and a rework, and a process model is generated as a flow shop.

First, the process model automatic generation system 210 reads, from the work performance data accumulation unit 240 (see FIG. 2), work performance data 1210 of a product for which a process model is to be created, and generates a process flow for each product (step 1220). In the work performance data 1210 shown in (a) of FIG. 13, processes of the first product (product 1) and processes of the second product (product 2) among the same products are stored.

In the generation of the process flow for each product (step 1220) shown in (b) of FIG. 13, a process flow for the product 1 and a process flow for the product 2 are created in accordance with the work performance data 1210. As can be seen from these flows, the product 1 and the product 2 can be displayed as process models. Here, nodes are indicated by circles and edges between the nodes are indicated by arrows, and when a process flow is not shown in the drawing, the process flow may be calculated in a form of data processed by a computer. As can be seen from (b) of FIG. 13, the execution order of the product 1 and the product 2 is greatly different.

Next, as shown in (c) of FIG. 13, when a closed path exists in the process flows for the product 1 and the product 2, the last edge of the path constituting the closed path is deleted such that the process flow becomes an acyclic path (step 1230). The closed path data is accumulated in the closed path accumulation unit 250 for each product. Next, as shown in (d) of FIG. 14, a synthesis flow is generated by combining all the process flows from which the closed path of the process flow for each product is deleted (1240).

Next, a process for restoring, as a flow shop, the edge deleted in step 1230 is executed (1250). At this time, when all the process flows for each product exist in the synthesis flow, the restoration process may not be executed. In the example shown in (d) of FIG. 14, although edges from the process 6 to the process 3 exist in the process flow for the product 1, the edges from the process 6 to the process 3 do not exist in the synthesis flow. Only in such a case, as shown in (d) of FIG. 14, the edges are restored as flow shops. By executing the above process, flow shop work such as return work can be prevented from being determined as a job shop.

As shown in FIGS. 11 to 14, after the production system between tasks is automatically determined based on the work performance data, a task flow for each product is generated based on the work performance data, and the production system between tasks is determined as "line" or "job shop" from a configuration of a model obtained by combining task flows. Here, a cyclic route is detected from the model obtained by combining the task flows. The cyclic route is defined as a job shop, and an acyclic route is defined as a line.

When a cyclic path exists in one product, the path is determined as a "return" and defined as a "line" instead of a job shop. Since a model can be generated by the "line" and the "job shop" as a result of the determination, the process model created in this manner is rendered so as to be identifiable by the "line" and the "job shop", and is displayed to the user.

[Display Screen]

FIG. 15 is a diagram showing an example of a screen on which a process model including a flow shop and a job shop is displayed. By operating the display screen 1300, a worker can obtain a function of displaying the process model and a function of editing the process model. In the process model display screen 1300, a database (DB) list button 1330 and a table list button 1340 are first displayed. Here, the table list button 1340 is pressed, and a process model list ("Model 1", "Model 2", "Model 3" . . . ) 1310 in the selected table (not shown) is displayed in an icon format. When the worker who creates a process model selects a target model from a process model list 1310 and clicks a display screen icon 1320, the automatically created process model is displayed on a display screen window 1360 on a lower side (or another screen) of the display screen icon 1320. Here, when an edit screen icon 1350 displayed on a right side of the display screen icon 1320 is clicked, the display on the display screen window 1360 is switched to the display on an edit screen (not shown). In the edit screen, a screen equivalent to the automatically created process model, any one of the screens shown in (b) and (c) of FIG. 13 and (d) and (e) of FIG. 14, or all of the screens can be displayed on the display screen window 1360, so that the worker edits the production system of the selected process model. Examples of an editing method include a method of moving each process node by dragging and dropping or the like, and a method of changing a production system between processes by clicking an edge. When the correction of the process model is completed, the worker clicks a registration icon 1370. Then, the registered process model is stored in the process model accumulation unit 260.

Second Embodiment

Next, a procedure for automatically generating a process model according to a second embodiment of the invention will be described with reference to FIG. 16. FIG. 16 shows a system configuration obtained by adding a production system master data accumulation unit 1410 and a production system abnormality detection unit 1420 to a system configuration of the process model automatic generation system 210 in FIG. 3. The system 210 stores master data in which a production system between processes is determined in advance in the production system master data accumulation unit 1410. The production system master data accumulation unit 1410 is, for example, a storage device such as a server or a memory. Since the same parts as those in FIG. 3 are denoted by the same reference numerals in other configurations and steps showing processing procedures, repetitive descriptions will be omitted.

The production system abnormality detection unit 1420 detects an abnormality in production system by comparing the master data accumulated in the production system master data accumulation unit 1410 with the production system between processes of the process model output through the process model correction unit 340. Here, when an abnormality is detected, the worker may be notified of the occurrence of the abnormality by the operation terminal 270. The production system abnormality detection unit 1420 can be used not only for detecting an abnormality in a production system, but also for planning a more efficient production system. For example, by displaying, on the operation terminal 270, a process model correction proposal created using the master data, it is possible to assist the user in making a correction decision.

Third Embodiment

FIG. 17 is a diagram showing an example in which the process model automatic generation system 210 according to a third embodiment adds a batch flow 1510 to one type of flow shop. In the third embodiment, the continuous flow 810, the line flow 820, and the batch flow 1510 are defined as flow shops, and in order to appropriately determine these flow shops and job shops, a product passing number accumulation unit 1610 is added to a system configuration in FIG. 3. A batch flow is a production system in which a superior route pattern through which numerous products pass exists, while an inferior route pattern through which a small number of products pass also exists.

In FIG. 17, a fixed route pattern 810 is a production system in which, for example, the process 1 to the process 5 are sequentially executed, and is also called a continuous flow. The line flow 820 is a fixed route pattern, but a step of moving from the process 1 to the process 3 is also possible. The batch flow 1510 is a flow that is different in a batch manner in the production system in which the process 1 to the process 5 are sequentially executed, such as a flow returning from the process 3 to the process 1 or a flow moving from the process 1 to the process 3. Here, numerical values (for example, "100" or "5") above arrows shown in the batch flow 1510 indicate the number of times executed in the order of the corresponding arrows as a result of counting the work performance data. That is, while the number of transitions from the process 1→the process 2→the process 3→the process 4→the process 5 is 100, while the number of returns from the process 3→the process 1 is 5, and the number of progresses from the process 1 to the process 3 is 5. A flow returning from the process 3 to the process 1 and a flow proceeding from the process 1 to the process 3 are recognized as batch processes. As described above, in the second embodiment, the continuous flow, the line flow, and the batch flow are determined to be flow shops.

FIG. 18 is a block diagram showing a functional configuration example of the process model automatic generation system 210 when the process model automatic generation system 210 according to the third embodiment supports the production system shown in FIG. 17. The product passing number accumulation unit 1610 is, for example, a storage device such as a server or a memory, and accumulates the product passing number between processes. The product passing number accumulation unit 1610 accumulates the product passing number between processes of the synthesis flow in the synthesis flow generation unit 320. The process model correction unit 340 refers to the product passing number accumulated in the product passing number accumulation unit 1610, and changes a production system from a job shop to a flow shop for a route determined to correspond to a batch flow. A threshold value of the product passing number for determining a superior route and an inferior route may be automatically determined based on data or may be selected by the user.

In the third embodiment, the product passing number accumulation unit 1610 is provided and configured such that the batch flow 1510 can be automatically created, so that various process models can be automatically generated.

Fourth Embodiment

Next, a fourth embodiment of the invention will be described with reference to FIG. 19. The process model automatic generation system 210 according to the fourth embodiment provides a user interface having a function of filtering work performance data in a specific period. FIG. 19 is a diagram showing an example of a screen that displays a process model including a flow shop and a job shop in the fourth embodiment. A display screen 1900 according to the present embodiment provides a user interface in which a work start time 1970, a work end time 1980, and a filtering button 1990 are added to the display screen in FIG. 15. The user selects a target model from a process model list 1910, selects a process model, and then clicks the display screen icon 1320 to display the process model on a display screen window 1960. Here, when the worker inputs the work start time 1970 and the work end time 1980 to limit a target period of work performance data for creating or displaying a process model, and then clicks the filtering button 1990, the process model displayed on the display screen window 1960 is switched to a process model regenerated only based on the work performance data from the work start time 1970 to the work end time 1980. As described above, when the user designates the work start time 1970 and the work end time 1980, the process model is filtered in a period, and a new model can be generated using only the work performance data performed in the designated period.

REFERENCE SIGNS LIST

200 overall system
210 model automatic generation system
230 work performance data generator
240 work performance data accumulation unit
250 closed path accumulation unit for each product
260 process model accumulation unit
270 operation terminal
310 work performance data selection unit
315 process flow generation unit for each product
320 synthesis flow generation unit
325 production system automatic determination unit
330 synthesis flow restoration unit
335 process model display unit
340 process model correction unit
500 work performance data
600 closed path data
810 continuous flow
820 line flow
830 job shop
1300, 1900 process model display screen

The invention claimed is:

1. A process model automatic generation system, comprising:
a process flow generation unit configured to automatically generate a process flow for each of a plurality of products based on work performance data collected at a production site, the work performance data including a product identifier that uniquely identifies a product, a process identifier that uniquely identifies a process, and a work date and time indicating a date and time when the process is executed;

a synthesis flow generation unit configured to generate a synthesis flow by combining a plurality of the process flows;

a production system automatic determination unit configured to determine a production system between processes based on a structure of the synthesis flow;

a synthesis flow restoration unit configured to generate a process model including a flow shop and a job shop based on the determined production system;

a work performance data accumulation unit configured to accumulate the collected work performance data; and a work performance data selection unit configured to select a target to be used as a material for generating a process model from work performance data stored in the work performance data, wherein the synthesis flow generation unit generates the synthesis flow using the work performance data selected from the work performance data, when a closed path exists in a flow in generating the process flow, the process flow generation unit executes a preprocess for deleting a part of the flow such that no closed path exists in the process flow, when a closed path exists in the synthesis flow, the production system automatic determination unit determines the closed path as a job shop, and the synthesis flow restoration unit automatically generates the process model by combining the job shop determined by the production system automatic determination unit with the synthesis flow.

2. The process model automatic generation system according to claim 1, wherein the synthesis flow restoration unit completes the process model by restoring a part or all of the flow deleted by the preprocess.

3. The process model automatic generation system according to claim 2, further comprising:

a process model display unit configured to display the process model generated by the synthesis flow restoration unit as a process model including a flow shop and a job shop; and a process model correction unit configured to provide an interface that allows a user to correct the displayed process model.

4. The process model automatic generation system according to claim 3, further comprising:

a master data accumulation unit configured to accumulate master data in which a production system between processes is determined in advance; and an abnormality detection unit configured to execute at least one of abnormality detection and planning of the production system by comparing a difference between a process model generated by the process model automatic generation system and information in which the production system between processes is determined in advance when corresponding master data exists in the master data accumulation unit.

5. A process model automatic generation method implemented by causing a computer including a processor to execute a specific program, the method comprising:

acquiring work performance data collected at a production site and automatically generating a process flow for each of a plurality of products, the work performance data including a product identifier that uniquely identifies a product, a process identifier that uniquely identifies a process, and a work date and time indicating a date and time when the process is executed;

generating a synthesis flow by combining a plurality of the process flows;

automatically determining a production system between processes based on a structure of the created synthesis flow;

automatically generating a process model in which a flow shop and a job shop are mixed by replacing a part of the processes from the flow shop to the job shop based on a result of the automatic determination;

providing a work performance data accumulation unit configured to accumulate the collected work performance data, wherein in the step of automatically generating the process flow, the process flow is generated using the work performance data of all or part of the plurality of products stored in the work performance data accumulation unit, in the step of automatically generating the process flow, when a cyclic path exists in one product, a last edge is removed, after a process model in which the flow shop and the job shop are mixed is automatically generated, the removed edge is restored, in the automatic determination step, a closed path of the synthesis flow is determined to be a job shop, and when a closed path exists in a process flow in one product, the closed path is determined to be a job shop.

6. The process model automatic generation method according to claim 5, further comprising:

providing a display unit configured to display the generated process model and an input unit configured to correct the displayed process model;

when the process model is displayed as the process model in which the flow shop and the job shop are mixed, drawing the job shop as one node; and providing an interface that allows a user to optionally correct a process model whose production system is automatically determined.

7. The process model automatic generation method according to claim 6, further comprising:

when master data in which a production system between processes is determined exists, executing at least one of abnormality detection and planning of a production system by comparing a difference between a process model generated by a process model automatic generation system and information in which the production system between processes is determined in advance.

8. The process model automatic generation method according to claim 7, further comprising:

determining a continuous flow, a line flow, and a batch flow as flow shops; and automatically generating the process model based on work performance data generated within a period designated by the user.

* * * * *